United States Patent
Lau et al.

(10) Patent No.: US 8,648,336 B2
(45) Date of Patent: Feb. 11, 2014

(54) METHOD FOR FABRICATION OF LAYERED HETEROJUNCTION POLYMERIC DEVICES

(75) Inventors: Leo W. M. Lau, London (CA); Tomas Trebicky, London (CA); Heng Yong Nie, London (CA)

(73) Assignee: The University of Western Ontario, London (CA)

(*) Notice: Subject to any disclaimer, the term of this patent is extended or adjusted under 35 U.S.C. 154(b) by 259 days.

(21) Appl. No.: 13/254,847

(22) PCT Filed: Mar. 3, 2010

(86) PCT No.: PCT/CA2010/000300
§ 371 (c)(1),
(2), (4) Date: Nov. 22, 2011

(87) PCT Pub. No.: WO2010/099609
PCT Pub. Date: Sep. 10, 2010

(65) Prior Publication Data
US 2012/0056167 A1    Mar. 8, 2012

Related U.S. Application Data

(60) Provisional application No. 61/202,476, filed on Mar. 3, 2009.

(51) Int. Cl.
*H01L 35/24*    (2006.01)

(52) U.S. Cl.
USPC .................................... 257/40; 257/E51.001

(58) Field of Classification Search
USPC .............................................. 257/40, E51.001
See application file for complete search history.

(56) References Cited

U.S. PATENT DOCUMENTS

| | | |
|---|---|---|
| 6,156,394 A | 12/2000 | Schultz Yamasaki et al. |
| 6,472,299 B2 | 10/2002 | Hiraoka et al. |
| 7,105,059 B2 | 9/2006 | Lee et al. |

OTHER PUBLICATIONS

Chen B. et al. "Organic/polymeric double—heterojunction light—emitting diodes." Semiconductor Optoelectronics. vol. 18. No. 2. Apr. 1997.
First Office Action for Chinese patent application No. 201080019797.X mailed Nov. 14, 2012.

*Primary Examiner* — Anthony Ho
(74) *Attorney, Agent, or Firm* — Lynn C. Schumacher; Hill & Schumacher

(57) ABSTRACT

Method for growing multilayer polymer based hetexjunction devices which uses selective breaking of C—H or Si—H bonds without breaking other bonds leading to fast curing for the production of layered polymer devices having polymer heterojunctions deposited by the common solution-based deposition methods.

15 Claims, 5 Drawing Sheets

METHOD FOR FABRICATION OF LAYERED HETEROJUNCTION POLYMERIC DEVICES

CROSS-REFERENCE TO RELATED APPLICATION

This application is a National Phase application claiming the benefit of PCT/CA2010/000300 filed on Mar. 3, 2010, in English, which further claims priority to U.S. Provisional Application No. 61/202,476, filed on Mar. 3, 2009, the entire contents of which are incorporated herein by reference.

FIELD OF THE INVENTION

Embodiments of the invention relate to the field of materials synthesis, fabrication of polymeric electronic, optoelectronic and optical devices, and the applications of conductive and insulating polymeric layers in electronic packaging.

BACKGROUND OF THE INVENTION

The scientific and technological advancement of organic conducting and semiconducting polymers has already led to an emerging industry of polymeric electronic and optoelectronic devices (referred therein as polymeric devices). Although the concepts of device operation and fabrication are not very different from those of the conventional silicon integrated circuits (ICs), a polymeric device differentiates it from a silicon IC by discarding as much as possible the expensive materials and fabrication tools in silicon IC production. In the emerging industry of polymeric device production, 12-16" single-crystal silicon wafers with part-per-billion impurity control are replaced by inexpensive sheets or foils of a common "house-hold" polymer.

The 3-D device structures having heterojunctions of conductor-semiconductor, semiconductor-semiconductor, semiconductor-insulator, and insulator-metal are not fabricated by chemical or physical vapor deposition but by solution-based polymer deposition in which a functional polymer with the desirable conductivity (conductive, semiconducting or insulating) is dissolved in a solvent and a layer of the solution-based polymer is placed onto the large polymeric substrate by spraying, dipping, or printing. The result is a low-cost technology which can be used for novel products outside the scope of the silicon ICs. An example of such novel products is a wearable device fabricated on a piece of fabric. The device can be a photovoltaic cell to convert light to electricity, a display panel for decoration or entertainment, or a health-monitoring sensor.

In the silicon IC industry, a family of electronic packaging technologies is employed to convert ICs into a card or board which can be conveniently connected with a power supply and other functional product components. It is conceivable that a new family of electronic packaging technologies will also be developed to support the polymeric device industry, and that multiple layers of insulating polymer with conductive polymer lines running between each pair of layers with proper inter-layer connections will be adopted.

A critical technology challenge in this context of solution-based device fabrication is that many of these functional polymers share similar solubility behaviors. As such, after the solution-based deposition of a functional polymeric layer (Polymer A), the solvent of the subsequent polymeric over-layer (Polymer B) may dissolve some of the molecules of Polymer A during the solution-based deposition of Polymer B. Obviously this will compromise the integrity of the functional layer of Polymer A and contaminate the Polymer B layer. In the prevalent technology approach, a thermal curable polymeric additive is mixed or molecularly integrated into each functional polymer. After a solution-based polymer deposition, heat is applied for a period of time to form enough cross-linking bonds in the polymer layer such that the cured (i.e., cross-linked) layer is no longer soluble in common solvents. With this treatment, functional polymeric heterojunctions can be formed and preserved. For the common polymer formulations in the present market, the curing treatment usually adopts a temperature of 80-250° C. to enable the cross-linking reaction by overcoming its transition-state energy barrier. The thermal curing time is usually about 30 minutes to 2 hours.

The curing temperature cannot be too high because polymer is typically relatively weak in thermal stability. The drawback of a low curing temperature is that the low curing rate means a long curing time and thus a low production throughput. This problem can be illustrated with some very recent recipes of optimized polymeric device fabrication reported in the literature. For example, Yamamoto, et al. (Thin Solid Film 516 (2008) 2695-2699) teaches the fabrication of a polymeric transistor by using the semiconductor-insulator polymeric heterojunction on a polymer substrate. In this example, the polymeric semiconductor is poly(3-hexythiophene), the insulating polymer is poly(4-vinyphenol) and the substrate is poly(ethylene naphthalate); so the nominal device structure is P3HT/PVP/PEN. In the device fabrication, 4 wt % of methylated poly(melamine-co-formaldehyde) was added to a 11 wt % of PVP in the organic solvent of propylene glycol monomethyl ether acetate as a cross-linking agent. After the solution-based deposition of this on PEN, the sample is pre-baked at 100° C. for 10 minutes to desorb the solvent, and then heated to 200° C. for an hour under a nitrogen atmosphere. Then the sequent solution-based fabrication steps can be applied. This example clearly shows two undesirable conditions in device production: (a) slow throughput and energy consumption both increase production costs; and (b) presence of a cross-linking agent in the functional polymer may compromise the device performance particularly when the functional polymer is a semiconducting or conducting polymer. Hence, technology development is required to resolve these problems.

In one recent invention (U.S. Pat. No. 7,468,287, Dec. 23, 2008), Newsome, et al. teach the insertion of a sacrificial layer between two functional polymeric layers, forming a nominal structure of Polymer-B/Polymer-S/Polymer-A. Polymers A and B are soluble in the same family of organic solvent which is different enough that they are not soluble in the solvent for Polymer-S. Under this condition of materials selection, the nominal structure of Polymer-B/Polymer-S/Polymer-A can be formed with the sequential solution-based deposition. By limiting the thickness of Polymer-S to less than 20 nm, the residual solvent in Polymer-B can permeate into the Polymer-S layer and break it down without disturbing the first functional Polymer-A layer. Although this technology has shown to be practical in producing some polymeric devices, it is not a general solution. In addition, the presence of Polymer-S at the heterojunction interface of Polymer-B/Polymer-A may degrade the interfacial device properties.

Cross-linking is the process of chemically joining molecules by covalent bonds. This is a common and important process both in nature and in industry, to build large and function-specific molecules from small and simple ones. In the polymer industry, monomers are cross-linked to macromolecular chains which can also be further cross-linked into polymeric networks. In the field, this process is commonly referred as curing; hence, in this patent, curing means cross-linking and cured means cross-linked. In the simplest example, a $CH_4$ molecule can be converted to a $CH_3$ radical by the cleavage of one of its C—H bonds, and two $CH_3$ radicals can then combine themselves to $C_2H_6$. Repeating the cleavage of C—H and recombination of carbon radicals can yield a large cross-linked hydrocarbon network, possibly in the form of a thin film. In other cross-linking reactions, a precursor having one type of chemical functionality is mixed with a different precursor with another chemical functionality, and the two precursors form cross-linking bonds via the chemical reaction of these two chemical functionalities. For example, a precursor with a carboxylic acid functionality can cross-link with another precursor with an alcohol functionality by ester condensation.

In a typical cross-linking process, precursor molecules with a reactive chemical functional group are synthesized and placed together. Another reactive reagent is added to activate the cross-linking reaction; the activation is typically enacted by bond-cleavage and radical formation. Heat or another energy source is typically required to break bonds. To reduce the energy barrier for this bond cleavage and to increase the reaction rate, a catalyst is commonly added. Furthermore, other chemical additives are often used to moderate the reaction rate, and to terminate the reaction after a certain degree of cross-linking is accomplished. Many of these reactive chemical reagents are toxic and environmentally harmful. As such, there is a desire to develop a "green" route of cross-linking so that the use of these chemical reagents can be reduced or eliminated.

To develop such a "green" and practical route of cross-linking, it is relevant to examine the processes for cleaving C—H in an organic precursor molecule because most organic molecules have many C—H bonds such that cleaving C—H bonds and recombining the resultant carbon radicals can be the most effective way of cross-linking. Rupturing and removing a hydrogen atom from a hydrogen-containing molecule is commonly referred as hydrogen abstraction in chemistry. A number of reactants can be used in hydrogen abstraction. Common reactants include hydrogen atom, halogen atom, hydroxyl radical, and other radical species. Although the reactants are reactive, activation energy is still commonly required for hydrogen abstraction and some reactions thus require adequate thermal energy (A. A. Zavitsas, *Journal of American Chemical Society* 120 (1998)6578-6586). Among these reactants, hydrogen atom is particularly attractive because it is not toxic and its generation is relatively easy. The hydrogen abstraction reaction of using atomic hydrogen to break a C—H bond of an alkane molecule is typically exothermal or energy-neutral but has a transition energy barrier of about 0.5 eV. As such, the reaction rate is relatively low at room temperature.

Indeed, for a gas phase reaction of $H+CH_4 \rightarrow H_2+CH_3$. with a constant supply of both reactants at a partial pressure of $1 \times 10^{-3}$ Torr at room temperature, the generation of $CH_3$. to a partial pressure of $10^{-3}$ Torr, in the absence of any side reactions, will take about one month. By raising the reaction temperature to 300° C., the same result can be obtained in about 0.3 second. Although similar examples of using thermal energy to drive chemical reactions forward are indeed widely used in industry, this heat-driven approach is not applicable to those reaction systems in which heat causes undesirable side reactions. For polymer manufacturing, heating the polymer above its glass transition temperature will cause undesirable deformation. Novel and economical reaction routes for selective C—H bond cleavage with a high throughput and without any heat requirement are thus desirable.

In another widely adopted method of cross-linking small organic precursor molecules to a polymeric film, the organic precursor molecules are fed into a gaseous plasma powered by a direct-current (DC), radio-frequency (RF) or microwave (MW) energy source. The science of technology of plasma polymerization has been adequately reviewed by pioneers in the field such as Yasuda (H. Yasuda, Plasma Polymerization, Academic Press, Inc., New York, 1985), Biederman (H. Biederman, edited, Plasma Polymer Films, Imperial College Press, London, 2004), and Fridman (A. Fridman, Plasma Chemistry, Cambridge University Press, New York, 2008). It is commonly recognized that even when pure organic precursor molecules are fed into plasma, the plasma chemistry is complex and many different bond-breaking processes are active in the plasma. In essence, when plasma is ignited in a gas, some atoms and molecules in the gas are ionized to generate a large number of electrons and ions. Typically these electrons can have an average energy of a few electron volts and a broad energy distribution.

Expressed in an equivalent value in temperature, these electrons can reach $10^5$ K. In the plasma, they diffuse much more quickly than ions and their frequent collisions with the atoms and molecules in the plasma lead to excitation, ionization, and bond dissociation. The relaxation of some of these excited species can emit light including ultraviolet light which can also cause secondary excitation, ionization, and bond dissociation. Hence, although a polymer film can be practically formed with plasma polymerization, it is difficult to control the resultant film to match a specific chemical specification such as a film having only one type of chemical functional group (e.g., COOH) in a certain desirable concentration (e.g., one COOH group per three carbon atoms such as that in polyacrylic acid).

In fact, Yasuda wrote, "most organic compounds with oxygen-containing groups such as —COOH, —CO—, —OCO—, —OH, and —O—, are generally reluctant to form a polymer, and the plasma polymers rarely contain the original oxygen-containing groups" (H. Yasuda, Plasma Polymerization, Academic Press, Inc., New York, 1985; pp. 112-113). In the context of the production of polymer devices, uncontrollable and undesirable mixture of chemical functionalities compromises the performance and product-yield of the devices; hence, plasma polymerization of functional polymers with tailor-made chemical functionalities for polymer device production has its limitation.

Several special plasma polymerization methods have been developed to address these limitations of the general plasma polymerization methods. For example, the technique of pulsed plasma polymerization has been developed to harness the complex processes of excitation, ionization, and dissociation in the plasma by supplying the plasma energy to the reactant gas in a train of pulses with controls of the duration, frequency and power of the pulses. The concept and applications of this technique have been explained by Friedrich et al. (J. Friedrich, W. Unger, A. Lippitz, I. Koprinarovl, A. Ghode, S. Geng, G. Kuhn, "*Plasma-based introduction of monosort functional groups of different type and density onto polymer surfaces. Part 1: Behaviour of polymers exposed to oxygen plasma*", Composite Interface 10(139-171) 2003; and "*Part 2: Pulsed plasma polymerization*", ibid 10(173-223)2003). In their work, monomer precursor molecules having a C═C bond such as acrylic acid ($H2C$═$CHCOOH$) receive a short pulse of plasma energy and undergo excitation, ionization and dissociation. Although undesirable reactions leading to the loss of the —COOH functional groups will inevitably occur, most of these undesirable reactions cease during the pulse-off-cycle. However, the polymerization chain reaction in cross-linking acrylic acid molecules persists even when the plasma pulse is off. In an optimized pulsed plasma polymerization process, when the cross-linking chain reaction runs out of stream, the plasma pulse is applied to prime the chain reaction again. For example, Friedrich et al. have demonstrated that up to 73% of the —COOH in acrylic acid can be retained in a polymer film formed by this pulsed plasma polymerization method. Since the loss of useful functional group and the formation of undesirable functional groups can still occur when the plasma pulse is on, an alternative technique to eliminate these problems is still desirable.

In the research and development of new reaction routes, scientists have discovered that the kinetic energy of a reactant can be an important reaction attribute. It can be used to drive a chemical reaction which otherwise relies totally on the thermal energy supplied to the reaction system and the chemical potentials of reactive chemical reagents. The best fundamental evidence can be found in most scientific articles on molecular beam research in the literature (see for example, M. A. D. Fluendy and K. P. Lawley, "*Chemical applications of molecular beam scattering*", Chapman and Hall, 1973). In this research, a beam of atoms or molecules having a specific kinetic energy and internal energy is directed to a target. The energy exchange and resultant chemical reactions are examined. Such experiments are, however, technically demanding and economically expensive. In a typical molecular beam experiment, kinetic energy is added to the atoms or molecules when they are adiabatically expanded with an inert gas through a small nozzle. The velocity of the atoms or molecules can increase to supersonic speed. However, this technique is not suitable for light species, since the kinetic energy of a light molecule like hydrogen traveling at supersonic speed is still much less than 0.1 eV. Although it is possible to speed up a heavy hydrogen-containing molecule such as HI and split it with a laser beam for the formation of hyperthermal atomic hydrogen, this is certainly not a practical method to practice C—H bond cleavage in industry.

The kinetic energies of the atoms or molecules can also be increased by ionizing them and then accelerating them using an electrostatic ion acceleration process. These accelerated ions can be used to bombard a target in an "ion bombardment" process. Many industrial processes indeed use ion bombardment to reduce the reliance of synthetic reactions on thermal energy and to promote reactions via non-thermal equilibrium pathways (see for example, O. Auciello and R. Kelly, "*Ion bombardment modification of surfaces*", Elsevier Science, 1984). In practice, ion bombardment of an electrically insulating surface is not practical because of surface charging. Although many analytical instruments such as ion microscopes circumvent such surface charging problems by flooding the ion bombarded area with low energy electrons, the concurrent supplies of both energetic ions and electrons with precise controls in energy and dosage to a large irradiation area for practical industrial manufacturing are technically challenging and economically expensive.

Recently Lau and coworkers have shown that bombarding an organic molecule with hyperthermal proton can preferentially break C—H bonds without breaking other bonds (R. W. M. Kwok and W. M. Lau, "Method for selectively removing hydrogen from molecules", US Patent Application 20030165635, filed Feb. 25, 2003; L. Xi, Z. Zheng, N. S. Lam, H. Y. Nie, O. Grizzi, and W. M. Lau, "*Study of the hyperthermal proton bombardment effects on self-assembled monolayers of dodecanethiol on Au(111)*", *J. Phys. Chem. C* 112, 12111-12115 (2008); C. Y. Choi CY, Z. Zheng, K. W. Wong, Z. L. Du, W. M. Lau, and R. X. Du RX, "*Fabrication of cross-linked multi-walled carbon nanotube coatings with improved adhesion and intrinsic strength by a two-step synthesis: electrochemical deposition and hyperthermal proton bombardment*", *Appl. Phys. A* 91, 403-406 (2008); W. M. Lau, Z. Zheng, Y. H. Wang, Y. Luo, L. Xi, K. W. Wong, and K. Y. Wong, "*Cross-linking organic semiconducting molecules by preferential C—H cleavage via "chemistry with a tiny hammer"*", *Can. J. Chem.* 85, 859-865 (2007); L. Xi, Z. Zheng, N. S. Lam, O. Grizzi, and W. M. Lau, "*Effects of hyperthermal proton bombardment on alkanethiol self-assembled monolayer on Au(111)*", *Appl. Surf. Sci.* 254, 113-115 (2007); Z. Zheng K. W. Wong, W. C. Lau, R. W. M. Kwok and W. M. Lau, "*Unusual kinematics-driven chemistry: cleaving C—H but not COO—H bonds with hyperthermal protons to synthesize tailor-made molecular films*", *Chem. Euro. J.* 13, 3187-3192 (2007); Z. Zheng, W. M. Kwok, and W. M. Lau, "*A new cross-linking route via the unusual collision kinematics of hyperthermal proton in unsaturated hydrocarbon: the case of poly(trans-isoprene)*", *Chem. Comm.* 29, 3122-3124 (2006); X. D. Xu, R. W. Kwok, and W. M. Lau, "*Surface modification of polystyrene by low energy hydrogen ion beam*", *Thin Solid Films* 514, 182-187 (2006); Z. Zheng, X. D. Xu, X. L. Fan, W. M. Lau, and R. W. M. Kwok, "*Ultrathin polymer film formation by collision-induced cross-linking of adsorbed organic molecules with hyperthermal protons*", *J. Amer. Chem. Soc.* 126, 12336-12342 (2004)). The novelty of this proton bombardment approach is the exploitation of the unusual kinematics when a hyperthermal proton strikes an organic molecule adsorbed on a conductive solid substrate. In this bombardment process, the incoming proton will first be neutralized by the conductive substrate when it is still >0.5 nm above the surface. The neutral atomic hydrogen projectile carrying a few eV in kinetic energy continues to approach the target organic molecule and enters first to the attractive chemical potential region and forms a transient molecule with the target. The kinetic energy then drives the projectile into the repulsive potential region and finally the projectile uses up its kinetic energy. If the projectile and target are merely two hard spheres, after the closest encounter they will fly apart and the maximum energy transfer is determined by the two masses with the formula: $4M_p M_t/(M_p+M_t)^2$. Hence, a projectile of an atomic mass unit of one can transfer its kinetic energy very effectively to a target of an atomic mass unit of one (hydrogen atom) but the maximum kinematic energy transfer drastically drops to 28% if the target has an atomic mass unit of twelve (carbon atom). This difference in kinematic energy transfer can be exploited, in principle, to preferentially break C—H bonds because the typical dissociation energy of C—H and other sigma bonds of an organic molecule is 4-5 eV.

Indeed, Lau and co-workers have demonstrated the feasibility of this concept by using protons of less than 20 eV to break C—H bonds without breaking other bonds in a variety of organic molecules. For example, by condensing polyacrylic acid as the precursor molecules on a silicon wafer surface, they have demonstrated the cross-linking of them into a stable molecular layer with retention of more than 95% of the —COOH group by their proton bombardment method. In all their published experimental data, protons are used because protons can be attracted from hydrogen plasma and the proton energy can be controlled quite precisely with the common techniques of ion optics. They have also confirmed the theoretical validity of the concept by ab initio molecular dynamics computations for the collisions of a proton with a simple hydrocarbon molecule under different collision trajectory conditions. Their published results are informative in laying the foundation of using kinematic energy transfer to break C—H bonds, but the approach of proton bombardment suffers the same surface charging problems of all ion bombardment techniques and is not practical for the industrial manufacturing of polymeric products. Although they have claimed that hyperthermal neutral atomic and molecular hydrogen can also be used to break C—H bonds, they have neither shown any data to substantiate this claim nor shown any practical way of generating a high flux of neutral hydrogen projectiles in a large irradiation area.

It would therefore be advantageous to provide an economical and scalable process for rapidly growing and curing multilayer heterojunction polymer devices that does not involve direct heating of the polymer layers for curing or cross linking the polymer constituents and which can be used with substrates which are conductive or highly resistive.

SUMMARY OF THE INVENTION

The present invention solves these problems in providing an economical and scalable process for rapidly growing and curing multilayer heterojunction polymer devices that does not involve direct heating of the polymer layers for curing or cross linking the polymer constituents. The present invention uses a novel and practical way of generating a high flux of hyperthermal neutral molecular hydrogen such that these projectiles, which carry no electrical charge, can be used to bombard the polymer constituent layer no matter whether the layer is electrically conductive or nonconductive, to preferentially break C—H (or Si—H) bonds and cross-link each polymer constituent layer prior to the solution-based deposition of the next layer. By adopting the invention as a green and fast curing method, polymer devices with heterojunctions of functional polymers can be fabricated at low costs with low environmental load.

The invention is applicable in producing a layer of functional specific macromolecules regardless of the electrical conductivity of the layer or the substrate. Particularly, the invention is applicable to cross-link (i.e., cure) a functional polymer layer deposited by the prevalent solution-based method or a powder-coating method no matter whether the functional polymer is electrically conducting, semiconducting or insulating, and whether the substrate is electrically conducting, semiconducting or insulating. The invention eliminates any requirements of cross-linking reagents, additives and catalysts. The invention is thus a green and fast curing method for the production of high quality polymer devices with heterojunctions of functional polymers having no undesirable impurities, at high throughput and low cost.

Embodiments of the invention are directed to methods for production of multilayer polymeric devices which involve use of polymer based materials containing C—H and/or Si—H bonds and which provide a method of selectively cleaving C—H and/or Si—H bonds of the functional polymer resulting in cross-linking or curing without the need for directly heating the material. The invention is also applicable for selectively cleaving Si—H bonds of organosilane molecules while the molecules are on the surface of a substrate or are constituents of a substrate.

The present invention provides a method for fabrication of heterojunction polymeric devices, comprising the steps of:

a) depositing a layer containing polymer-forming molecules having any one or combination of C—H bonds and Si—H bonds on a surface of a substrate;

b) producing, and directing a flux of hyperthermal neutral molecular hydrogen having kinetic energies in a range from about 1 eV to about 100 eV to the layer such that upon impact of hyperthermal neutral molecular hydrogen molecules on molecules containing any one or combination of C—H bonds and Si—H bonds the C—H bonds and Si—H bonds are selectively ruptured resulting in cross-linking of the polymer-forming molecules to form a cured polymer layer on the substrate; and c) repeating steps a) and b) a selected number of times to fabricate a heterojunction polymeric device having said selected number of cured polymer layers formed one on top of the other.

The layer containing the polymer-forming molecules may be deposited from a liquid solution containing the polymer-forming molecules. Each layer may be formed using different polymer forming molecules. Alternatively the same polymer forming molecules may be used and different dopants may be included in each of the different layers.

An embodiment of the invention comprises a solution-based deposition of a functional polymer on the surface of a substrate. The functional polymer can also contain other materials to optimize its functional properties. Neutral hydrogen molecules with hyperthermal kinetic energy are then used to bombard the precursor molecules. The bombardment breaks C—H and/or Si—H bonds without breaking other types of bonds. For example, the bombardment can break C—H bonds of an alkane branch without breaking any C—C bonds of the alkane. Afterwards the activated molecules having carbon radicals are cross-linked while on the substrate to form a dense polymeric film with a drastic reduction in solubility so that the solution-based polymer deposition can be repeated for the production of a polymer device with one or more than one heterojunction.

Other embodiments of the invention are directed to make functional products made by the above described methods and other methods. Such functional products include polymer based diodes, transistors, and protective sealants. These and other embodiments of the invention are described in further detail below. The description of the specific embodiments is for purposes of illustration and is not intended to limit the invention.

The potential number of applications for embodiments of the invention is not limited. For example, embodiments of the invention can be used to fabricate polymeric products, electronic devices, photonic devices, micro-mechanical devices, and medical devices. They can also be used in biotechnology applications.

The potential number of applications for embodiments of the invention is unlimited. Further features of the invention will be described or will become apparent in the course of the following detailed description.

BRIEF DESCRIPTION OF THE DRAWINGS

The invention will now be described by way of example only, with reference to the accompanying drawings.

FIG. 1(a) shows molecular dynamics of 15 eV $H_2$ arriving with its molecule axis perpendicular to the C1-H3 bond of $C_2H_6$ and H9 of $H_2$ hitting H3 of $C_2H_6$ (the respective views of H4 and H7 are blocked by H5 and H8) with 5 femto-second per step: After collision, the $H_2$ is scattered with a loss of about 8 eV in kinetic energy (55% energy transfer) and a very small gain in vibrational and rotational energy. The $C_2H_6$ gains an average kinetic energy of about 4 eV and an average internal energy of 4 eV, and becomes highly excited with H3 loosely bounded and oscillating between C1 and C2.

FIG. 1(b) Molecular dynamics of 16 eV $H_2$ arriving with its molecule axis perpendicular to the C1-H3 bond of $C_2H_6$ and H9 of $H_2$ hitting H3 of $C_2H_6$ (the respective views of H4 and H7 are blocked by H5 and H8) with 5 femto-second per step: After collision, the $H_2$ is scattered with a loss of about 9 eV in kinetic energy (55% energy transfer) and a very small gain in vibrational and rotational energy. The H3 is pushed from C1 to C2 and this causes the cleavage of the H6-C2 bond. The H6 is leaving with a very small kinetic energy. The $C_2H_5$ has a small average kinetic energy, and a high internal energy of 7 eV due to the bond cleavage and vibrational/rotational excitation.

FIG. 1(c) Molecular dynamics of 80 eV $H_2$ arriving with its molecule axis perpendicular to the C1-C2 bond of $C_2H_6$ and H9 of $H_2$ hitting C2 of $C_2H_6$ (the respective views of H4 and H7 are blocked by H5 and H8) with 5 femto-second per step: After collision, the $H_2$ is scattered with a loss of about 7 eV in kinetic energy (9% energy transfer) and a very small gain in vibrational and rotational energy. The $C_2H_6$ suffers no bond cleavage, with about 2 eV gain in kinetic energy and some gain in rotational/vibrational energy.

DETAILED DESCRIPTION OF THE INVENTION

Figure 1A:
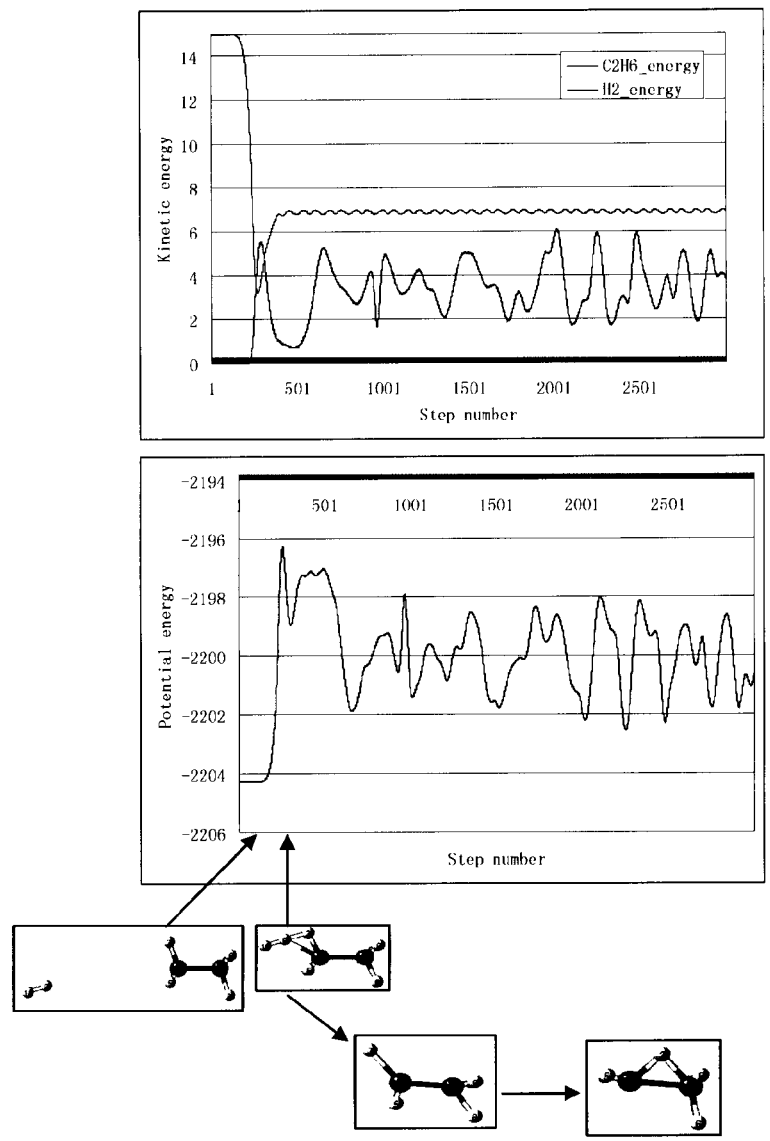
FIGS. 1(a), 1(b) and 1(c) are diagrammatic representations showing computational simulations of preferential C—H cleavage by collision of a hyperthermal neutral molecular hydrogen with a stationary $C_2H_6$ molecule.

Generally speaking, the systems described herein are directed to a method for fast cross-linking polymeric layers for the fabrication of heterojunction polymeric devices. As required, embodiments of the present invention are disclosed herein. However, the disclosed embodiments are merely exemplary, and it should be understood that the invention may be embodied in many various and alternative forms. The Figures are not in scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to a method for fast cross-linking polymeric layers for the fabrication of heterojunction polymeric devices.

As used herein, the term "about", when used in conjunction with ranges of dimensions, temperatures or other physical properties or characteristics is meant to cover slight variations that may exist in the upper and lower limits of the ranges of dimensions so as to not exclude embodiments where on average most of the dimensions are satisfied but where statistically dimensions may exist outside this region.

Molecules containing C—H or Si—H bonds are abundant, and some of them can be cross-linked into functional polymeric layers which are conducting, semiconducting or insulating. Most organic molecules contain C—H bonds, and most organosilane molecules have C—H and Si—H bonds. When C—H or Si—H bonds are cleaved, carbon or silicon radicals are formed. These radicals are reactive and can form cross-linking bonds by recombination or insertion. If the activated molecule is on the surface of a solid substrate, it can cross-link with other molecules on the solid substrate and/or can bind to the substrate through the formed active reaction site. A stable network of molecules can thus be formed on the substrate after cross-linking. Also, if the hydrogen atoms are selectively ruptured from a molecule, the backbone of the molecule and any specific chemical functionalities on the backbone can be preserved. Embodiments of the invention can therefore produce a layer with a stable molecular network having molecules with specific, predetermined chemical functionalities. Particularly, cross-linking increases the stability and decreases the solubility of the molecules. Therefore, a polymer layer deposited by a solution-based method can be cured and one or more than one polymer heterojunction can be built for polymer device production.

The present invention teaches the use of hyperthermal hydrogen bombardment to fast cure a solution-based polymer deposit without any requirements of cross-linking reagents, additives and catalysts. By adopting the invention as a green and fast curing method, polymer devices with heterojunctions can be fabricated at low costs with low environmental load.

As shown in the Background section, the mass-dependent nature in kinematic energy transfer which is the tenet of the binary collision theory describing the collision of two hard spheres can be used to explain why a hydrogen projectile can transfer more of its kinetic energy to a hydrogen atom of a target molecule than a carbon atom of the same target molecule. The mass-dependent nature can then be exploited for the design of a process for breaking C—H bonds without breaking C—C or other bonds, and thus for cross-linking organic precursor molecules into a functional-specific molecular film with the retention of the chemical nature of the precursor molecules. Since atoms and molecules are not hard spheres and the collisions of real atoms and molecules cannot be described accurately by the binary collision theory, the inventors and their research collaborators have resorted to ab initio molecular dynamics computations to track exactly how a neutral molecular hydrogen projectile can use its hyperthermal kinetic energy to break a C—H bond without breaking a C—C bond in its collision with a simple alkane molecule such as $C_2H_6$.

Figure 1B:
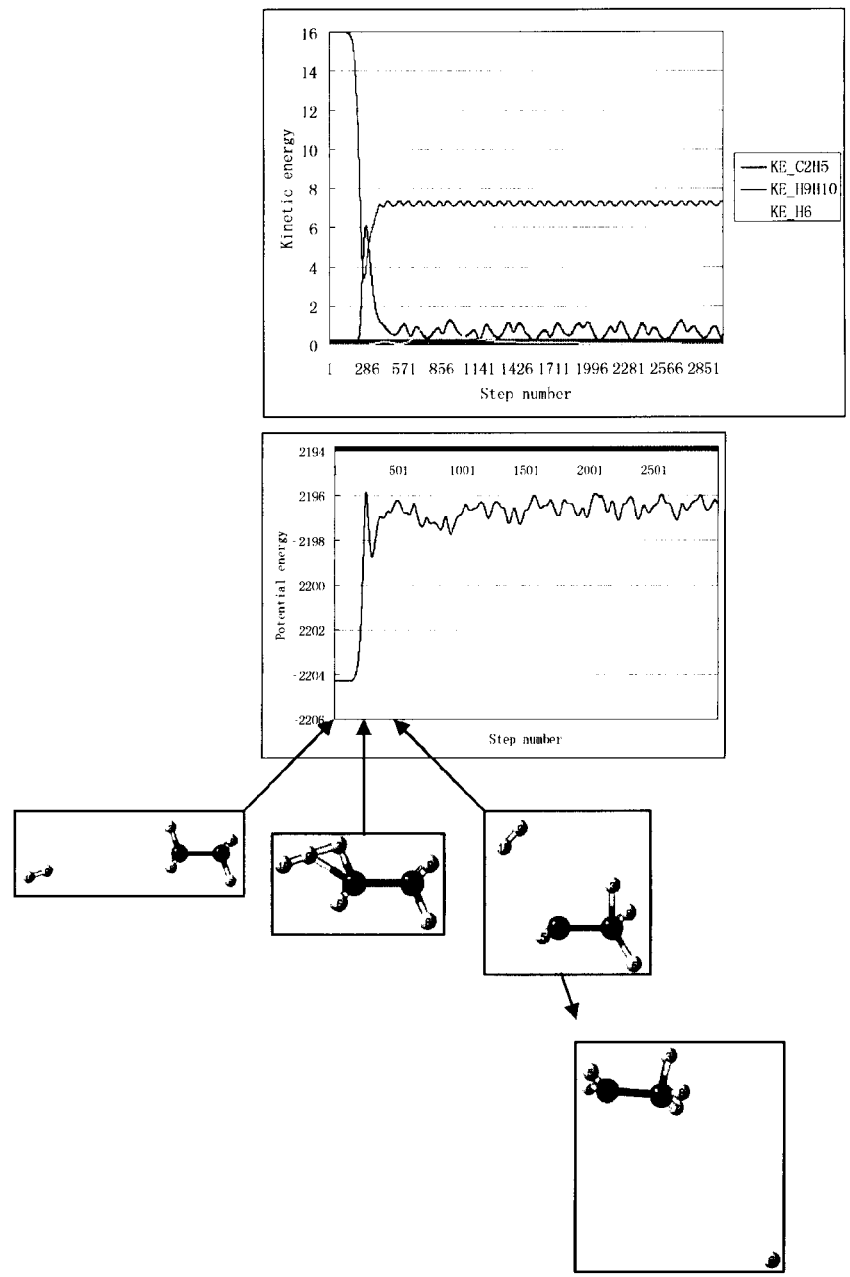
Figure 1C:
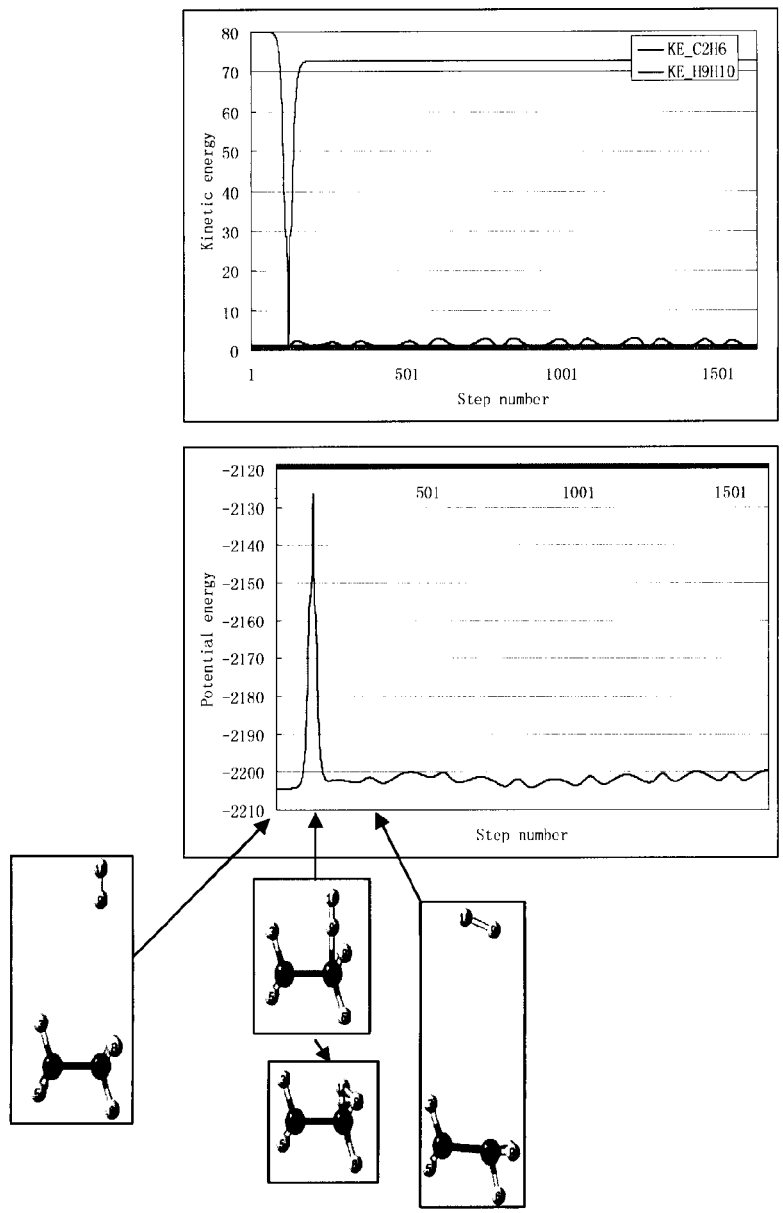

The results are summarized in FIG. 1(a) to FIG. 1(c). In FIG. 1(a), a neutral $H_2$ projectile with a kinetic energy of 15 eV is hitting a $C_2H_6$ target, with the $H_2$ molecular axis perpendicular to the H3-C1 axis of $C_2H_6$ and with H9 of $H_2$ hitting H3. Since $H_2$ and $C_2H_6$ are both stable molecules, there is virtually no attractive chemical force between them when they encounter. Instead they enter into a repulsive regime in which potential energy rises at the expense of kinetic energy.

After exhausting its kinetic energy, $H_2$ rebounds from the highly excited $C_2H_6$. The scattered $H_2$ retains about 7 eV in kinetic energy, much higher than the residual kinetic energy for $H_2$ hitting a free H atom. This is reasonable because the H3 hit by the $H_2$ projectile is bonded to C1 of $C_2H_6$. In the context of the binary collision model, one may assume that the $H_2$ projectile hits a target with an effective mass of about 10 because a hard sphere of mass 2 hitting a hard sphere of mass 10 results in kinematic energy transfer of 56%.

The results in FIG. 1(a) are derived from the leading-edge quantum chemistry calculations which give scientific insights much more accurate than the binary collision model. They clearly show that the loss in kinetic energy is partitioned to a combination of translational, rotational, and vibrational energy. Particularly H3 becomes only loosely bonded and oscillating between C1 and C2. When it moves to C2, H6 is forced to move away from C2 and the H6-C2 bond is about to break. In fact, the bond breaks when the original energy of the neutral $H_2$ projectile is raised from 15 eV to 16 eV for the same collision conditions.

The molecular dynamics results for the 16 eV collision are summarized in FIG. 1(b). In both cases shown in FIGS. 1(a) and (b), the scattered $H_2$ loses about 55% of its kinetic energy. In comparison, when the $H_2$ projectile hits the C2 atom of $C_2H_6$ with the molecular axis of $H_2$ perpendicular to the C—C bond axis, the $C_2H_6$ target remains intact even for a projectile kinetic energy of 80 eV and the scattered $H_2$ loses only about 9% of its kinetic energy. Similar computational results have also been collected for different collision trajectories and conditions to confirm the collision-induced preferential C—H cleavage. As expected, when the molecular axis of the $H_2$ is along the C—H bond axis of the target molecule, the fraction of kinetic energy partitioning to vibrational excitation of the scattered $H_2$ is higher than those of other collision trajectories. At an initial projectile kinetic energy of about 35 eV, the scattered $H_2$ is excited close to the vibrational bond-dissociation. When the scattered $H_2$ dissociates, the hyperthermal hydrogen atoms thus generated can conduct collision-assisted hydrogen abstraction. This will further increase the probability of C—H bond cleavage. In conclusion, the ab initio molecular dynamics computations provide an accurate scientific description of the physics and chemistry how neutral molecular hydrogen can use its hyperthermal kinetic energy to break C—H bond without breaking C—C bond.

For the industrial exploitation of the preferential C—H bond cleavage with hyperthermal neutral $H_2$ in a high throughput manufacturing mode of operation, the present invention provides a novel and practical method of generating a high flux of hyperthermal neutral $H_2$.

Figure 2:
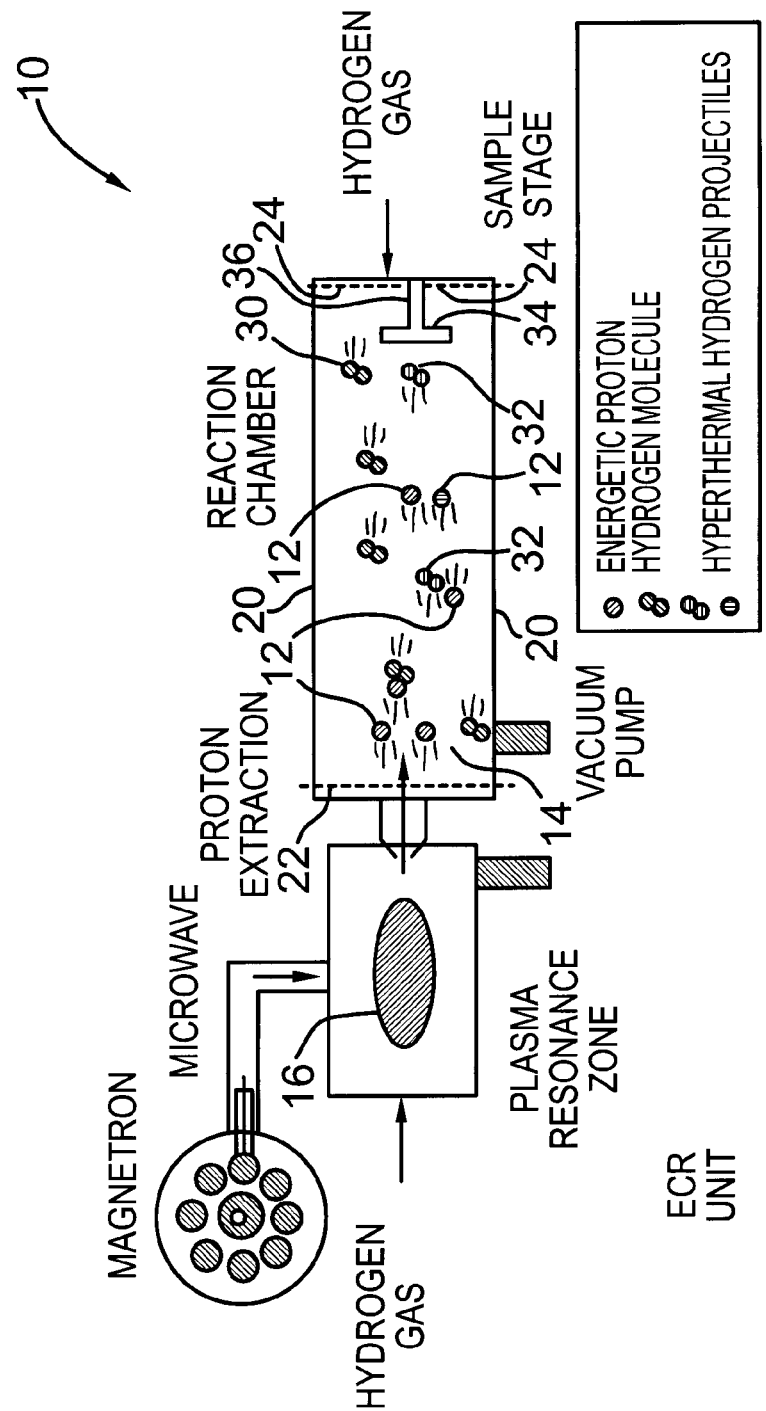
FIG. 2 shows a schematic of an exemplary, non-limiting reactor system for the generation of hyperthermal hydrogen projectiles for preferential C—H cleavage and C—C cross-linkage: (1) generation of an ECR hydrogen plasma; (2) extraction and acceleration of protons; (3) cascade collisions initiated by the energetic protons in the drift chamber containing molecular hydrogen; (4) hyperthermal molecular hydrogen hitting the adsorbed organic molecules on the sample stage to break C—H bonds and to form C—C cross-links with no undesirable bond cleavages.

Referring to the apparatus shown generally at 10 in FIG. 2, protons 12 are extracted into a drift zone 14 from a hydrogen plasma 16 which can be a DC plasma, an RF plasma, an ordinary microwave plasma, or an electron cyclotron resonance (ECR) microwave plasma. The drift zone 14 is a volume enclosed in a chamber 20 bounded by a number of properly placed electrodes 22 and 24 with the same electrical potential such that there is virtually no electric field in the drift zone 14. Hence, the kinetic energy of the protons 12 entering the drift zone 14 is controlled by a set of grid electrodes 22 between the plasma and the drift zone 14. Such grid electrodes are also used to reduce gas flow from the plasma chamber and the chamber housing the draft zone (drift chamber) so that a proper gas pressure in the plasma chamber can be maintained when the gas pressure in the drift chamber is adjusted by pumping or gas-feeding. For example, an ECR hydrogen plasma can be maintained in the pressure range of about $1 \times 10^{-4}$ to $5 \times 10^{-3}$ Torr.

If the hydrogen pressure of the drift zone 14 is adjusted to $1 \times 10^{-3}$ Torr, the mean free path of hydrogen collision in gas phase at room temperature is about 9 cm. The average kinetic energy of all molecular hydrogen 30 in the drift zone 14 prior to the entrance of any accelerated protons 12 is only about 0.04 eV because they are at thermal equilibrium at room temperature. These hydrogen molecules 30 are often referred as thermal molecular hydrogen. Statistically when a proton 12 enters into the drift zone and travels one mean free path, there is a 63% chance that it will collide with a hydrogen molecule 30 in the gas phase. Its kinetic energy will be shared with the thermal hydrogen molecule 30 to form a hyperthermal neutral molecular hydrogen projectile 32 and the energy transfer depends on the impact parameter (how close they collide). These two scattered projectiles 12 and 32 will have a kinetic energy much higher than the other thermal hydrogen molecules 30 in the gas phase. When each of these two scattered projectiles 12 and 32 travels another mean free path, there is a 63% chance that it will collide with another hydrogen molecule 30 and may transfer a certain amount of kinetic energy to the colliding partner to form more hyperthermal neutral molecular hydrogen projectiles 32.

As such, a cascade of collisions will be initiated by each proton 12 entering into the drift zone 14. The proton 12 will keep losing its kinetic energy and more and more hyperthermal neutral molecular hydrogen projectiles 32 are produced. If the length of the drift zone is described as a number of mean free path lengths, then the total number of hyperthermal neutral molecular hydrogen 32 generated by each proton 12 entering into the drift zone 14 goes up with 2 to the power of the number of mean free path lengths. Hence, by adjusting the hydrogen pressure and length of the drift chamber, one can control the number of hyperthermal molecular hydrogen molecules 32 reaching the sample. The schematic diagram of collisions in FIG. 2 is drawn to illustrate the generation of hyperthermal molecular hydrogen 32 by the kinematic energy transfer from accelerated proton 12 to thermal molecular hydrogen 30. In practice, the number of hydrogen molecules 30 is much higher than the number of hyperthermal molecular hydrogen 32, and the number of hyperthermal molecular hydrogen 32 is much higher than the number of protons 12. For example, if the pressure of hydrogen 30 in the drift zone is adjusted such that the mean free path is 5 cm and the sample is placed at 50 cm, the number of hyperthermal molecular hydrogen 32 reaching the sample can be about orders of magnitude higher than that of protons 12.

Figure 3:
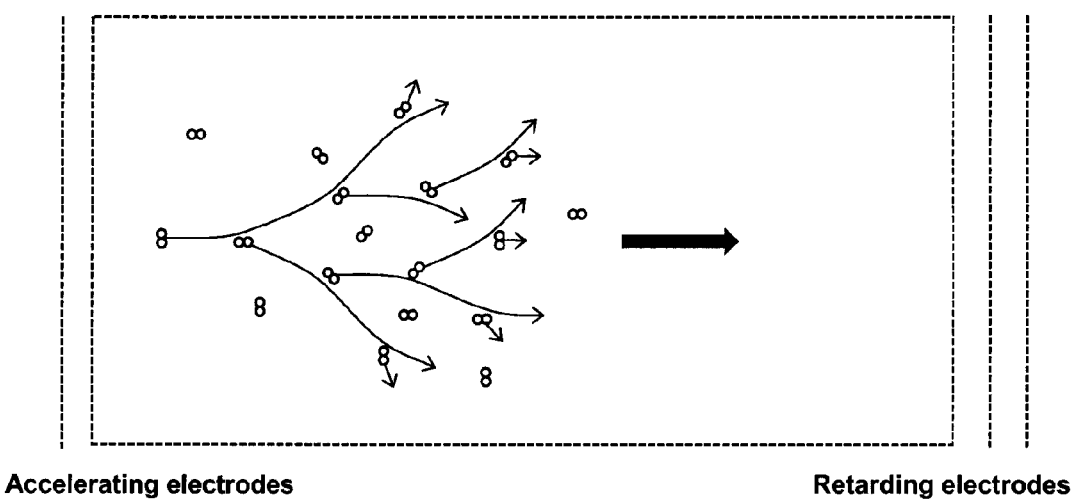
FIG. 3 illustrates the concept of the present method of generating a high flux of hyperthermal neutral molecular hydrogen using the reactor system of FIG. 2.

If each proton 12 is accelerated to 320 eV prior to its entrance to the drift zone 14 and if the drift zone condition is set to generate on the average hyperthermal molecular hydrogen molecules 32 per proton entering into the drift zone, the average kinetic energy of the hyperthermal molecular hydrogen projectiles 32 at the exit of the drift zone will be about 10 eV. Hence, by adjusting the proton extraction conditions and the drift zone collision conditions, one can generate a high flux of hyperthermal neutral molecular hydrogen projectiles 32 which, when they impact on the surface of the substrate 34 which is mounted on a substrate holder 36 at the exit of the drift zone, can induce C—H cleavage without breaking other bonds undesirably. The concept in this method of generating a high flux of hyperthermal neutral molecular hydrogen projectiles 32 is directed to the substrate surface is illustrated in FIG. 3.

Broadly, the hyperthermal neutral molecular hydrogen projectiles 32 may have kinetic energies in the range from about 1 eV to about 100 eV, and more preferably kinetic energies in a range from about 1 eV to about 20 eV will be sufficient for rupturing C—H and/or Si—H bonds. The final average kinetic energy of the hyperthermal neutral molecular hydrogen projectiles 32 will depend on the kinetic energies of the extracted protons and the average number of collisions in the cascades of the hyperthermal neutral molecular hydrogen projectiles 32 which depends on the mean free path, which depends on pressure.

It is noted that any one or combination of ruptured C—H bonds and Si—H bonds can cross-link with themselves or with other chemical moieties at the surface resulting in a change in surface properties. The surface properties which can be modified are any one or combination of Young's modulus, hardness, ionic conductivity, electrical conductivity, surface energy, surface chemistry, friction, permeability, diffusivity, adhesion, wettability, and surface biochemical properties.

The degree of the change in that can be induced in these surface properties may be controlled by controlling any one or combination of the energy and fluence of the hyperthermal neutral molecular hydrogen molecules hitting said substrate surface, and the molecules at or on said substrate surface.

In addition, it may be desirable to introduce pre-selected molecules into the chamber while hyperthermal neutral molecular hydrogen molecules bombard the substrate surface to induce cross linking of the ruptured C—H and/or Si—H bonds with these pre-selected molecules for altering a chemical composition of the surface compared to the rest of the substrate. The pre-selected molecules are selected for imparting desired functionality to the substrate surface.

For example, if producing a diode one would produce one polymeric layer which is n-doped and a second polymeric layer which is p-doped which may be achieved by either using two different polymers one of which when polymerized forms an n-doped layer and the other forming a p-doped polymer layer. Alternatively the same material could be produced by when producing one material the method would involve introducing a dopant that is incorporated into the polymer rendering the layer doped n-type and then when depositing the other layer on top of the n-doped layer introducing another dopant molecule that renders the second layer p-type. The same would be carried out for producing polymer based transistors and the like.

In the context of C—H bond cleavage, the published work of Lau and coworkers and the references cited in these publications have explained other ways in accomplishing the results of C—H cleavage. None of these prior arts teach C—H bond cleavage using hyperthermal neutral $H_2$. For example, as described in the Background Section, common hydrogen abstraction by atomic hydrogen is viable but the reaction rate is practical only with the supply of an adequate amount of thermal energy to the reaction system. This thermal-driven approach is not applicable to any products sensitive to heating. Most polymer products and many electronic devices are sensitive to heating. Hence, the coupling of heating to hydrogen abstraction by atomic hydrogen to break C—H bond is not as attractive as the present invention in many industrial applications.

In the context of C—H cleavage to drive C—C cross-linking, Hiraoka et al. (U.S. Pat. No. 6,472,299 B2, October 2002) teach vapor deposition of gas molecules, such as silanes, germanes, and organic metal compounds, by using hydrogen radicals (atomic hydrogen) from a plasma to decompose these gas molecules and yield a thin film of their constituents. The prime purpose of Hiraoka et al. is to form a thin film of silicon, germanium or metal. Although the method of Hiraoka et al. can be varied to using hydrogen radicals for rupturing hydrogen atoms from adsorbed molecules and for breaking C—H of the organic components of the organic metal compounds, such a variation is no different from the common method of hydrogen abstraction using atomic hydrogen. In addition, Hiraoka et al. do not teach how the kinetic energy of hydrogen radicals changes the nature of thin film formation, and how the kinetic energy of hydrogen radicals can be adjusted in the range of 1-100 eV accurately and precisely. The method also does not teach the generation of hyperthermal neutral $H_2$, the control of the kinetic energy of the neutral $H_2$, and the amplification of the flux of hyperthermal neutral $H_2$, and the exploitation of these hyperthermal neutral $H_2$ to bombardment precursor molecules on a substrate to break C—H bonds without breaking other bonds. Hence, the present invention is fundamentally different from the method of Hiraoka et al.

In the context of breaking C—H bond of a plastic surface, Kato et al. teach to use hydrogen plasma pretreatment of a plastic surface to increase adhesion of a dielectric overlayer such as $SiO_2$. Similarly Schultz Yamasaki et al. (U.S. Pat. No. 6,156,394, December 2000) also teach pretreatment of polymeric optical substrates using direct (or remote) microwave or RF hydrogen plasmas (or other gas plasmas) to increase the adhesion of an overlayer of dielectrics subsequently deposited on the substrate.

Although both Kato et al. and Schultz Yamasaki et al. do not teach the exact nature of the reactive species in the plasma, one of ordinary skill in the art may understand that a hydrogen plasma will comprise neutral molecular hydrogen, atomic hydrogen, protons and electrons. Although both Kato et al. and Schultz Yamasaki et al. do not teach the exact mechanism of adhesion, one of ordinary skill in the art may understand that neutral molecular hydrogen do not react with a plastic surface. But atomic hydrogen can break C—H bonds by hydrogen abstraction. In addition, ions and electrons can also react with the substrate surface. Such reactions depend on the electrical potential of the plasma which is typically positive relative to its surroundings, at a typical potential value of not much more than 10 eV. As such, protons are pushed to the plastic surface until the surface is charged up positively.

As shown by Lau and coworkers, proton bombardment of a plastic surface in this energy range can lead to preferential C—H cleavage and generation of carbon radicals. In the presence of electrons in the plasma, a positive potential on the plastic surface higher than the plasma potential cannot be established. Hence, proton bombardment of the electrically insulating plastic surface can be maintained. However, the bombardment energy is always smaller than the plasma potential and the control of this bombardment energy is difficult and inconvenient. Hence, although the method of Kato et al. and the method of Schultz Yamasaki et al. can be varied to break C—H bonds preferentially with proton bombardment, the variation is not as practical as the method taught by Lau and coworkers.

Although the method of Kato et al. and the method of Schultz Yamasaki et al. can be varied to break C—H bonds with hydrogen abstraction by the atomic hydrogen in the hydrogen plasma, the variation is no different from the common method of hydrogen abstraction by atomic hydrogen. These two methods also do not teach the generation of hyperthermal neutral $H_2$, the control of the kinetic energy of the neutral $H_2$, and the amplification of the flux of hyperthermal neutral $H_2$, and the exploitation of these hyperthermal neutral $H_2$ to bombardment precursor molecules on a substrate to break C—H bonds without breaking other bonds. Hence, the present invention is fundamentally different from the method of Kato et al. and the method of Schultz Yamasaki et al.

In the context of breaking C—H bonds of hydrocarbon molecules for the formation of a cross-linked film, Grobe, III et al. (U.S. Pat. No. 6,200,626 B1, March 2001) teach a hydrocarbon plasma coating method in which hydrocarbon molecules are fed into a plasma for breaking up and activating the molecules so that they can cross-link themselves onto a substrate surface. Although Grobe, III et al, do not explain the basic physics and chemistry, one of ordinary skill in the art may understand that some hydrocarbon molecules in a typical plasma condition can be ionized, excited, and driven to bond dissociation. The bond dissociation is not confined to C—H cleavage but this lack of chemical selectivity is not important in the method of Grobe, III et al., because carbon radicals will be generated no matter whether C—H, C—C or other bonds are cleaved. The recombination of two carbon radicals will generate a new C—C cross-link and the accumulation of such cross-links will lead to the formation of a hydrocarbon coating. The exposure of the surface of such a hydrocarbon coating will also induce bond dissociation and create carbon radicals.

The recombination of some of these carbon radicals will further increase the degree of cross-linking of the resultant hydrocarbon coating and increase its mechanical strength. Since both the science of the method of Grobe, III et al. and the invention objective of Grobe, III et al., are the activation of the hydrocarbon molecules in the plasma to form a hydrocarbon coating, the method does not teach the selective C—H bond dissociation without other bond dissociation. The method also does not teach the generation of hyperthermal neutral $H_2$, the control of the kinetic energy of the neutral $H_2$, and the amplification of the flux of hyperthermal neutral $H_2$, and the exploitation of these hyperthermal neutral $H_2$ to bombard precursor molecules on a substrate to break C—H bonds without breaking other bonds. Hence, the present invention is fundamentally different from the method of Grobe, III et al.

In the context of forming specific chemical functionality on a polymer surface, the present invention is significantly better than the pulsed plasma polymerization method because the precursor molecules are fed directly to the plasma in the pulsed plasma polymerization method so their decomposition during the pulse-on-cycle is inevitable. Friedrich et al. have shown a maximum retention of 73% of —COOH when the pulsed plasma polymerization method is used to polymerize acrylic acid. In the present invention, the maximum retention is >99%.

Other embodiments of the invention are described in further detail below. According to one specific embodiment, a thin film of a functional polymer is deposited on an electrically conducting, semiconducting or insulating substrate by a solution-based deposition method such as spraying, dipping, spin-casting, printing, or electrochemically precipitating. The film is cured by bombardment with hydrogen projectile particles having energies high enough to break C—H bonds or Si—H bonds of the functional polymer, but not high enough to undesirably break other bonds. In this embodiment, the hydrogen projectile particles comprising hyperthermal neutral molecular hydrogen are generated by the cascade collisions illustrated in FIG. 3.

While a preferred method of depositing the layer of polymer-forming precursors (polymers, monomers etc.) is from a liquid solution, it will be understood that the layers could be grown using other techniques, including epitaxial, sputter deposition to mention just a few non-liquid based techniques.

For each layer grown the same polymer forming molecules may be used but with different dopants for each layer so that each solution contains the same polymer forming molecules but different dopants depending on the desired chemical, electronic, physical properties of each layer. Alternatively, the different layers may be grown using different polymer forming molecules, with or without dopants depending on the desired properties.

Model-examples of embodiments of the invention are provided below. In these model-examples, hydrogen projectile particles comprising hyperthermal neutral molecular hydrogen are generated with the technique and apparatus illustrated in FIG. 2. In the first set of model-examples, dotriacontane, $CH_3(CH_2)_{30}CH_3$, was selected to test for selective C—H bond breaking using hyperthermal neutral molecular hydrogen bombardment. This molecule is large enough so that it does not desorb in vacuum even without cooling. It can be coated uniformly by any solution-based method such as spin coating on a substrate. In addition, dotriacontane has a linear molecular structure and contains only saturated C—C and C—H bonds, which eases the determination of any structural changes in the synthetic process.

In the second set of model-examples, polyacrylic acid was also selected to test for selective cleavage of C—H bonds without breaking other bonds including the CO—H bond of the —COOH group. In the third set of model-examples, polyisoprene was selected to show that a thick layer of polymer with a thickness of <10 nm to >100 microns can be formed with the hyperthermal hydrogen bombardment curing. These model-examples all teach the fast curing of electrically insulating polymer layer.

In the fourth example, poly(3,4-ethylenedioxythiophene) (commonly referred as PEDT) mixed with poly(styrene sulphonate) (commonly referred as PSS) as the conductivity "dopant" of the PEDT semiconducting polymer was selected because PEDT:PSS is widely used both conducting polymer and semiconducting polymer in the current polymer device industry. The example shows that a PEDT:PSS layer deposited by a solution-based method can be fast cured by the hyperthermal hydrogen bombardment method.

In the fifth set of model-examples, poly(3-Hexylthiophene) (commonly referred as P3HT) was selected because P3HT is widely used as a semiconducting polymer. This functional polymer of the polythiophene family has a hexyl alkane chain per thiophene unit and thus has a high concentration of C—H bonds for the deployment of the fast curing technology with hyperthermal hydrogen bombardment.

Several substrate configurations were selected in this example to fully demonstrate the applicability of the present invention. Device-grade highly polished Si (100) wafers were used for the reproducibility of their flat substrate surfaces. Typically they were pre-treated with ultrasonic cleaning in a methanol bath, UV-ozone cleaning, and HF-etching for removing surface contaminants and surface oxides. The precursor molecules were typically deposited onto the precleaned silicon wafer by spin casting. The coating uniformity was checked by atomic force microscopy (AFM). To model a conductive substrate, a silicon wafer was grounded properly with a large-area back ohmic contact. To model an electrically insulating substrate, the silicon wafer was electrically isolated. Polyethylene and polypropylene sheets were also used to model electrically insulating polymer substrates.

X-ray photoelectron spectroscopy (XPS) was used to measure the thickness of the precursor molecular layer. The bombardment induced C—H bond cleavage and the subsequent C—C cross-linking were probed by the solubility of the bombarded layer in the organic solvent which was used to dissolve and spin-cast the precursor molecules. If the bombarded layer was not cross-linked, the bombarded layer was completely dissolved. If the bombarded layer was only cross-linked at a low level, the bombarded layer was partially removed by the dissolution test. The changes in layer thickness were accurately measured by XPS. If the bombardment energy was not too high, no C—C bonds were cleaved and the layer thickness would not change by the bombardment. Hence, measuring the layer thickness with XPS was also used to determine if C—C bonds were cleaved.

With the proposed selectivity in bond breakage, one expects to observe cross-linking and the generation of secondary carbons which were not present in the molecular film prior to ion bombardment. In the literature, the present inventors found that while the valence band (VB) XPS of polyethylene and polypropylene (G. Beamson and D. Briggs, "*High resolution XPS of Organic Polymers, The Scienta ESCA* 300

Database", Wiley, England, 1992.) both have two spectral bands at 14 and 19 eV, an additional band at 17 eV is evident in polypropylene and assigned as spectral characteristics of secondary carbons (R. M. France and R. D. Short, *Langmuir* 14, (1998)4827-4835.) When VB XPS was applied to the virgin $C_{32}H_{66}$ film and the ion bombarded film, the present inventors found that the virgin film gave the two expected bands at 14 and 19 eV, and the treatment by hydrogen bombardment led to the generation of an additional spectral band at ~17 eV and thus secondary carbon formation. Cross-linking of the precursor molecules was confirmed. From the XPS probing depth, the thickness of the cross-linked molecular film was found to be about 5 nm.

Time-of-flight secondary ion mass spectrometry (TOF-SIMS) was found to be an adequate technique to measure the degree of cross-linking of the precursor molecules by comparing the intensity of high mass secondary ion mass fragments from the layer with and without bombardment. This method was adopted to assess the degree of cross-linking, in complement to the dissolution test in conjunction with XPS. The AFM technique was also used to measure the changes of Young modulus as a function of bombardment to gauge the degree of cross-linking.

TOF-SIMS was used to depth profile samples with polymer heterojunctions prepared by the fast curing technology using hyperthermal hydrogen bombardment, and by other methods, in order to show the merits of the fast curing technology using hyperthermal hydrogen bombardment.

The present invention will now be illustrated using the following exemplary, non-limiting examples.

Example 1

An ECR microwave hydrogen plasma was maintained with a low power input of 200 W and a proton flux of 3 mA over an extraction area of 200 cm² was extracted with an extraction electrode to accelerate the protons to a kinetic energy of 96 eV into the drift zone 14 in FIG. 2. The drift zone was fed with molecular hydrogen at a pressure of $8 \times 10^{-4}$ Torr. Substrates coated with 5 nm of dotriacontane were placed at 50 cm from the proton entrance to the drift zone. As such, the nominal flux ratio (hyperthermal neutral molecular hydrogen to proton) was estimated to be over 10 and the average energy of the hyperthermal neutral molecular hydrogen was estimated to be less than 10 eV. The substrates were bombarded by the hydrogen projectile particles comprising hyperthermal neutral molecular hydrogen with the bombardment duration controlled using a shutter. Cross-linking was completed in 40 seconds of bombardment under this set of conditions, which was confirmed with the dissolution test in conjunction with XPS measurements of thickness and composition.

The evidence of no C—C bond cleavage induced by the bombardment was confirmed by the lack of any measurable changes in the thickness of the precursor molecular layer. For the determination of the effects of ions drifted from the plasma at 50 cm away from the sample, a positively biased grid electrode was placed above the sample during bombardment. For the determination of the effects of electrons drifted from the plasma at 50 cm away from the sample, a negatively biased grid electrode was placed above the sample during bombardment.

These comparative experiments confirmed that screening these ions and electrons did not change the cross-linking results. Therefore, even if these ions and electrons may induce molecular cross-linking on the substrate surface, the effects are negligible in comparison to the cross-linking effects by the hyperthermal neutral molecular hydrogen under the working conditions of the present invention. The same cross-linking results were obtained no matter whether the substrate was an electrically grounded silicon wafer, an electrically isolated silicon wafer, or a polymer. Therefore, the effectiveness of hyperthermal neutral molecular hydrogen bombardment to preferentially cleave C—H bonds and to induce cross-linking is confirmed.

In these proof-of-concept experiments, the ECR plasma condition was purposely set to produce a relatively low proton flux so that the bombardment experiments could be accurately timed. The throughput of the production of a cross-linked layer with an area of over 300 cm² can be much faster than 1 second. In fact, by increasing the microwave power and fine tuning the ECR plasma conditions, the inventors had estimated a proton flux of $>5 \times 10^{16}/cm^2 s$, over 500 times higher than that the flux used in the above bombardment experiments. Hence, the throughput in producing cross-linked molecular films can be very high. The throughput can also be increased by generating more hyperthermal $H_2$ by controlling the cascade collisions with $H_2$ pressure and the length of the drift zone. Therefore, it is conceivable to feed the work-piece in the form of a roll of polymer foil pre-coated with the precursor molecules into the present reactor or a scale-up version of the reactor for practical fast production of a cross-linked molecular layer with a specific chemical functionality/functionalities on a polymer foil.

Example 2

The experiments in EXAMPLE 1 were repeated with the same conditions except that the sample location was placed further away from the proton entrance to the drift zone. The flux factor was raised and the average energy of the hyperthermal neutral molecular hydrogen was reduced. There was no measurable cross-linking for the same bombardment time when the drift distance was changed to 75 cm. The ineffectiveness in cross-linking is attributed to the fact that the hyperthermal neutral molecular hydrogen projectiles do not have enough kinetic energy to break C—H bonds. The results from this set of experiments also indicate that atomic hydrogen drifted from the plasma to the sample is not an important reactant causing cross-linking in comparison to hyperthermal neutral molecular hydrogen properly generated in the drift zone because the flux of atomic hydrogen from the plasma should not change much when the sample location was moved from 50 cm to 75 cm. If atomic hydrogen can cause cross-linking effectively, the sample located at 75 cm should also show some sign of cross-linking.

Example 3

The same experiments in EXAMPLE 1 were repeated with the sample location at 50 cm and with polyacrylic acid as the precursor molecules. For a 10 nm polyacrylic layer, the cross-linking was completed in 80 seconds for hyperthermal molecular hydrogen at a nominal average energy of 6 eV. The retention of the —COOH functionality was found, with XPS, to be 90%. When this average bombardment energy was raised to 12 eV by increasing the extraction voltage, the —COOH retention factor dropped to 40%. This is consistent with the expectation that violent bombardment causes undesirable —COOH degradation. When the thickness of the polyacrylic acid layer was reduced to 5 nm, a bombardment of 10 seconds at this nominal average bombardment energy of 6 eV was enough to complete the cross-linking in reference to the dissolution test. The reduction of the bombardment time (i.e., fluence) requirement further increased the —COOH retention to >95%. As expected, a reduction of bombardment flux can reduce the probability of —COOH degradation.

Example 4

The above experiments in EXAMPLE 3 were repeated under the same conditions except that the polyacrylic acid precursor molecules were replaced with polyacrylic acid having a short side alkene chain with an unsaturated C=C bond. For a film of these new precursor molecules at 10 nm in thickness, the bombardment time requirement to completely cross-link the layer with hyperthermal molecular hydrogen at a nominal average energy of 6 eV was less than 1 second. The —COOH retention was ~99% because the required bombardment fluence was so low. The drastic increasing in cross-linking efficiency was attributed to the fact that the unsaturated alkene attachment can be cross-linked via a chain reaction instead of totally relying on C—H cleavages and subsequent carbon radical recombination.

Example 5

In a comparative trial to demonstrate the difference between the present invention and the conventional plasma surface modification methods, a 10 nm layer of polyacrylic acid with the alkene side chain was placed at 5 cm from the plasma to model direct plasma exposure. Another sample was placed at 50 cm to receive hyperthermal molecular hydrogen bombardment at a nominal average energy of 6 eV. Both samples were exposed for 50 seconds. The sample located close to the plasma lost>90% of the —COOH functionality with the residual oxygen present as a mixture of oxygen-containing groups. In comparison, the sample located at 50 cm and exposed to hyperthermal molecular hydrogen with a nominal average energy of 6 eV retained ~99% of the —COOH group without any other different oxygen-containing group. This trial test demonstrates that the present invention is fundamentally different from other conventional surface modification by plasma exposure.

Example 6

A thin layer (10 nm) and a thick layer (500 μm) of polyisoprene were formed and bombarded with the conditions of EXAMPLE 1. The curing of the thin layer and the thick layer were both confirmed by the dissolution test and thickness measurements.

Example 7

A layer of PEDT:PSS prepared by spin-casting was cured with the conditions of EXAMPLE 1. The fast curing was confirmed by the dissolution test and thickness measurements. The cured film was found to withstand with no materials removal by the dissolution test. The film performance was better than those cured by the standard thermal curing method in the temperature range of 80-340° C. in air or in vacuum. Particularly, the electrical conductivity of the film cured by the hyperthermal hydrogen bombardment method could be optimized easily by changing the bombardment condition, to a value higher than the maximum electrical conductivity obtained by the conventional thermal curing method.

Example 8

A layer of P3HT prepared by spin-casting was cured with the conditions of EXAMPLE 1. The fast curing was confirmed by the dissolution test and thickness measurements. The cured film was found to withstand with no materials removal by the dissolution test, with the same stability performance as a film cured by the standard thermal curing method. In addition, the electrical conductivity of the film cured by the hyperthermal hydrogen bombardment method could be optimized easily by changing the bombardment condition, to a value higher than the maximum electrical conductivity obtained by the conventional thermal curing method.

Example 9

A stack of functional polymer heterojunctions was prepared to demonstrate the present invention in producing such a stack for polymer device production. The model-stack comprises the following functional polymer layers: (1) the first layer being polyacrylic acid to model an electrically insulating layer with a high hydrophilicity; (2) the second layer being PEDT:PSS to model a conducting polymer layer the solution-based deposition of which can dissolve and damage the first layer if the first layer is not properly cured; (3) the third layer being P3HT to model a semiconducting layer the solution-based deposition of which can dissolve the second layer and cause damage of both the second and third layer if the second layer is not properly cured; (4) the fourth layer being polyacrylic acid to model an electrically insulting layer the solution-based deposition of which can partially dissolve and damage the third semiconducting layer if the third layer is not properly cured; (5) the fifth layer being docosanoic acid ($CH_3(CH_2)_{20}COOH$) to decrease the hydrophilicity of the top insulating layer to protect the semiconducting layer; and (6) the sixth layer being polyisoprene to convert the top insulating layer to a thick hydrophobic cap layer to protect the polymer device.

The stacks prepared by the fast curing technology using the hyperthermal hydrogen bombardment conditions similar to those of EXAMPLE 1 were characterized with depth profiling using TOF-SIMS. The results of the desirable sharp heterojunction interfaces were demonstrated. In comparison, the same sequences of heterojunction polymer depositions without the curing treatments did not give the expected stacks of polymer heterojunctions. For the stacks cured by the conventional thermal curing method of 160° C. for an hour, the depth profiles were also not as sharp as those prepared by the hyperthermal hydrogen bombardment method. The total curing time for the hyperthermal hydrogen bombardment method was a few seconds. For the conventional thermal curing method, the curing time was a few hours. Furthermore, the conventional thermal curing method could not cure the layers of polyacrylic acid, docosanoic acid, and polyisoprene because each of these layers only has the corresponding pure polymer with no cross-linking additives.

In the present description, example embodiments are given with reference to specific configurations and techniques. One of ordinary skill in the art would appreciate that other embodiments having other configurations and method steps are possible. For example, any conventional production technique can be used to produce the composition of the coating(s), so long as the technique is competent to produce the desired composition. For example, the relative concentrations of the materials in the coatings, of course, may be varied, and impurities may be tolerated, so long as the resulting formulations are still competent to produce desired characteristics. Other embodiments having other configurations or techniques are all within the scope of this invention, given the knowledge provided by the present description to one of ordinary skill in the art. Moreover, features of one or more embodiments of the invention may be combined in any suitable manner without departing from the scope of the present invention.

As used herein, the terms "comprises" and "comprising" are to be construed as being inclusive and open rather than exclusive. Specifically, when used in this specification including the claims, the terms "comprises" and "comprising" and variations thereof mean that the specified features, steps or components are included. The terms are not to be interpreted to exclude the presence of other features, steps or components.

It will be appreciated that the above description related to the invention by way of example only. Many variations on the invention will be obvious to those skilled in the art and such obvious variations are within the scope of the invention as described herein whether or not expressly described.

What is claimed is:

1. A method for fabrication of heterojunction polymeric devices, comprising the steps of:
   a) depositing a layer containing polymer-forming molecules having any one or combination of C—H bonds and Si—H bonds on a surface of a substrate;
   b) producing, and directing a flux of hyperthermal neutral molecular hydrogen having kinetic energies in a range from about 1 eV to about 100 eV to the layer such that upon impact of hyperthermal neutral molecular hydrogen molecules on molecules containing any one or combination of C—H bonds and Si—H bonds the C—H bonds and Si—H bonds are selectively ruptured resulting in cross-linking of the polymer-forming molecules to form a cured polymer layer on the substrate; and
   c) repeating steps a) and b) a selected number of times to fabricate a heterojunction polymeric device having said selected number of cured polymer layers formed one on top of the other.

2. The method according to claim 1 wherein the flux of hyperthermal neutral molecular hydrogen is generated by the steps of forming a plasma and extracting from said plasma a flux of protons having energies in a range from about 50 eV to about 1 keV, and directing said flux of protons into a chamber into which molecular hydrogen is introduced, the pressure of molecular hydrogen in said chamber being maintained such that a mean free path of said molecular hydrogen is sufficiently smaller than a size of said chamber so that said molecular hydrogen that has acquired energy from said protons undergo multiple collisions with other hydrogen molecules thereby imparting energy to said other hydrogen molecules for producing said flux of hyperthermal neutral molecular hydrogen, and wherein said substrate is mounted in said chamber spaced from an entrance into said chamber of said flux of protons.

3. The method according to claim 1 wherein said range of kinetic energies of said hyperthermal neutral molecular hydrogen is from about 1 eV to about 20 eV.

4. The method according to claim 1, wherein step a) includes producing a liquid solution containing the polymer-forming molecules having any one or combination of C—H bonds and Si—H bonds, and depositing a layer of said liquid solution on a surface of a substrate.

5. The method according to claim 4 wherein each time step a) is performed the same polymer-forming molecules is used to grow each layer but for each layer different dopant molecules are incorporated into each liquid solution to give each layer a different dopant.

6. The method according to claim 4 wherein each time step a) is performed the same liquid solution of polymer-forming molecules is used to grow each layer.

7. The method according to claim 6 wherein each time step a) is performed a different solution containing different polymer-forming molecules having any one or combination of C—H bonds and Si—H bonds is produced and a layer grown therefrom.

8. The method according to claim 1 wherein the layer containing polymer-forming molecules is deposited using any one or combination of spraying, spin-coating, dip-casting, jet-printing, and screen-printing.

9. The method according to claim 1 wherein the deposited layer containing polymer-forming molecules has a thickness which ranges from an atomic monolayer to more than 100 nm.

10. The method according to claim 1 wherein the polymer-forming molecules comprise saturated or unsaturated organic molecules.

11. The method according to claim 1 wherein the polymer-forming molecules comprise saturated or unsaturated organic molecules with chemical functional groups.

12. The method according to claim 1 wherein the polymer-forming molecules comprise saturated or unsaturated silanes and their derivatives.

13. The method according to claim 1 wherein the substrate is selected from the group consisting of polymers, electrically insulating materials, electrically semiconducting materials, and electrically conducting materials.

14. A multilayer heterojunction device produced by the method of claim 1.

15. The multilayer heterojunction device according to claim 14 wherein which is any one of a polymer based diode, a polymer based transistor, a polymer based optoelectronic device, a polymer based optical device, polymer based electronic packaging and a protective sealant.

* * * * *